United States Patent [19]
James

[11] 3,734,315
[45] May 22, 1973

[54] MEANS FOR TRANSPORTING PALLETIZED LOADS

[75] Inventor: Wayne H. James, Detroit, Mich.

[73] Assignee: Palmer-Shile Company, Detroit, Mich.

[22] Filed: July 8, 1970

[21] Appl. No.: 53,194

[52] U.S. Cl. .......214/38 CC, 105/366 B, 105/366 C, 211/176
[51] Int. Cl. .............................................. B65g 67/02
[58] Field of Search ..........................211/176, 148; 214/38 CC; 280/179; 224/42.1 C; 105/366 B, 366 C

[56] References Cited
UNITED STATES PATENTS

| 3,519,140 | 7/1970 | Wellman, Jr. | 211/182 |
| 2,805,776 | 9/1957 | Levitin | 211/176 |
| 3,014,604 | 12/1961 | Loomis | 214/38 CC |
| 2,988,252 | 6/1961 | Crane | 224/42.1 C |
| 3,523,612 | 8/1970 | Hall | 211/148 |
| 2,812,974 | 11/1957 | McHugh | 214/38 CC |
| 3,112,034 | 11/1963 | Kaufman et al. | 211/148 |
| 1,044,889 | 11/1912 | Hyde | 211/148 |

Primary Examiner—Gerald M. Forlenza
Assistant Examiner—Lawrence J. Oresky
Attorney—Harness, Dickey and Pierce

[57] ABSTRACT

A collapsible pallet rack for mounting in a container, comprising end frames connected by tiers of front and rear telescoping beams. Pallets are detachably mounted on these beams by latches which are released in response to the presence of a fork lift.

6 Claims, 15 Drawing Figures

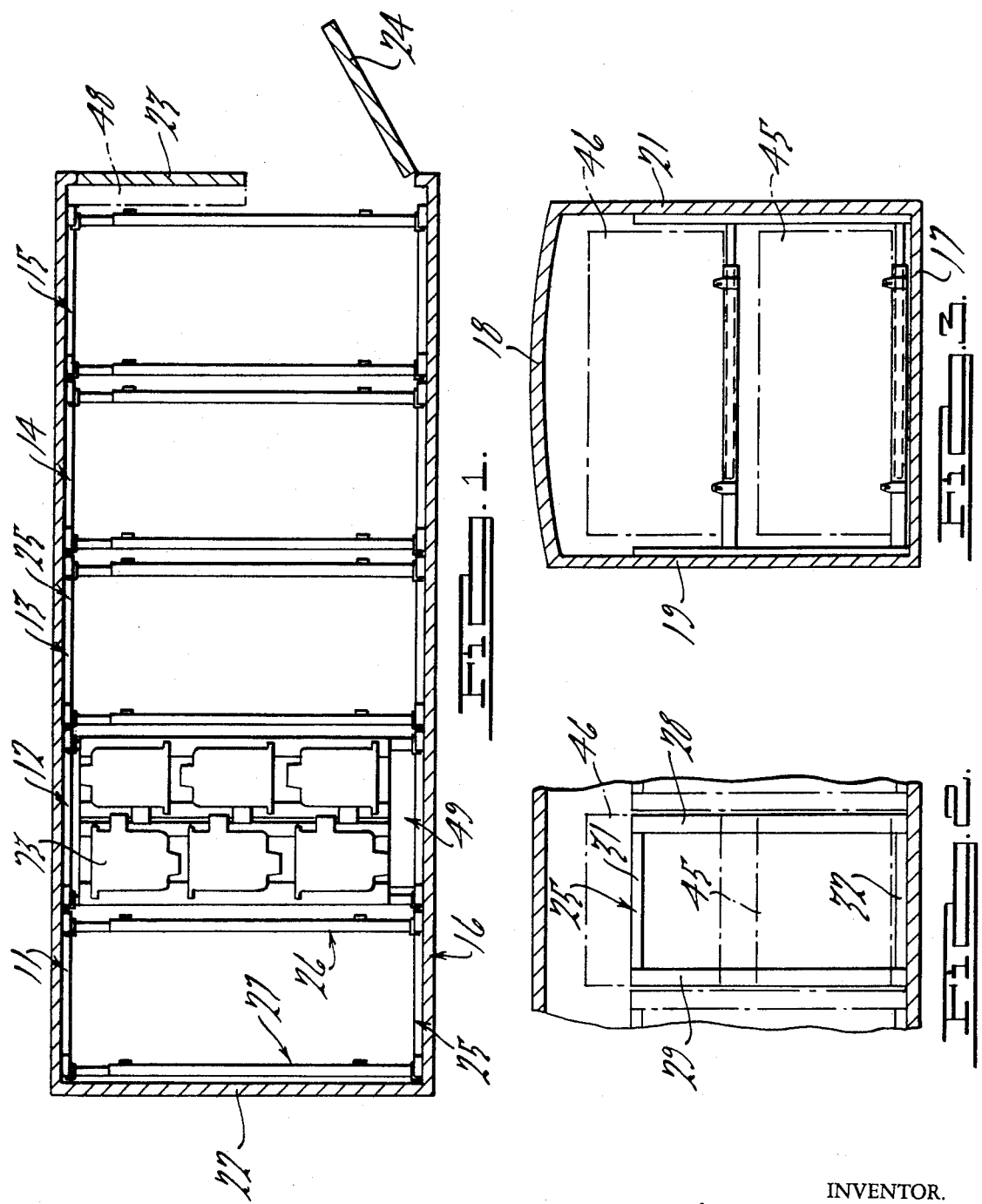

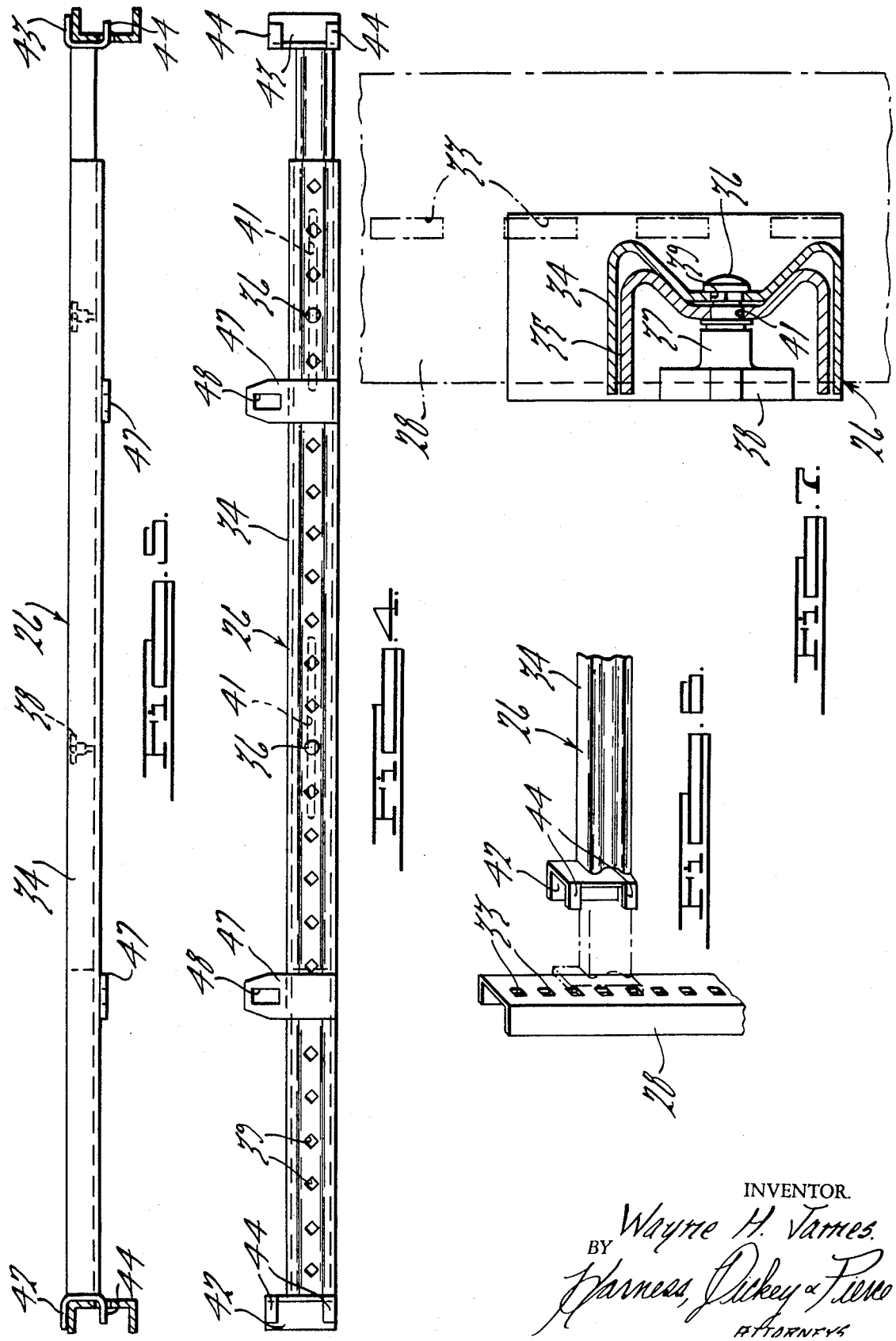

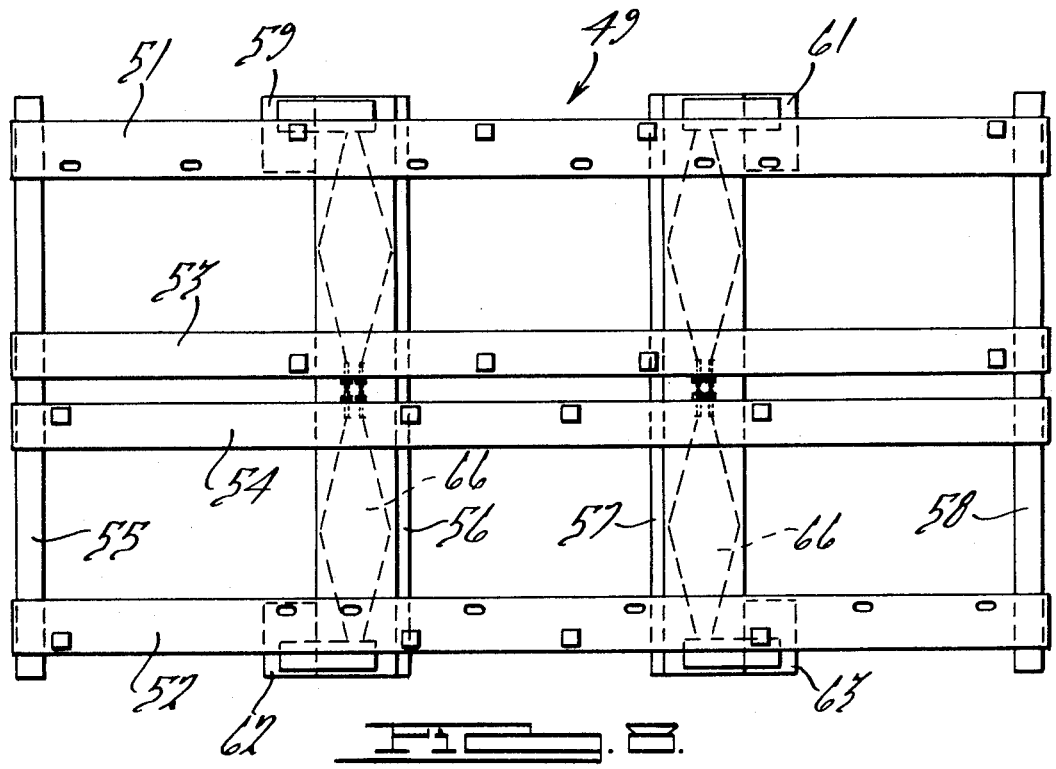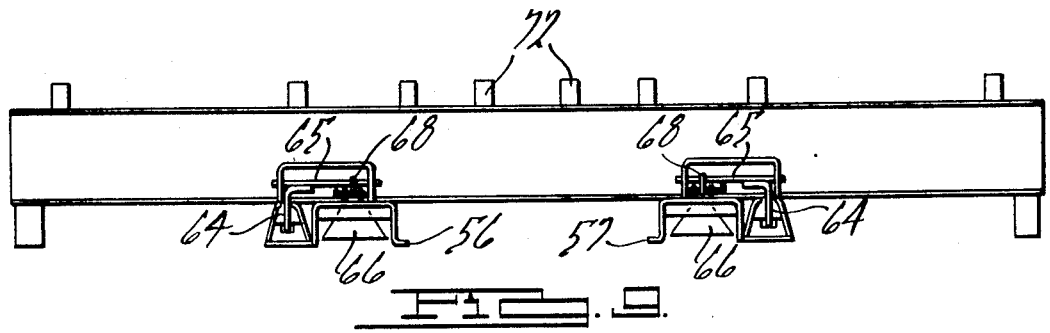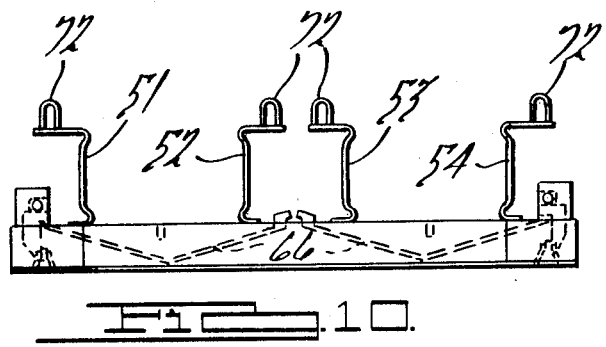

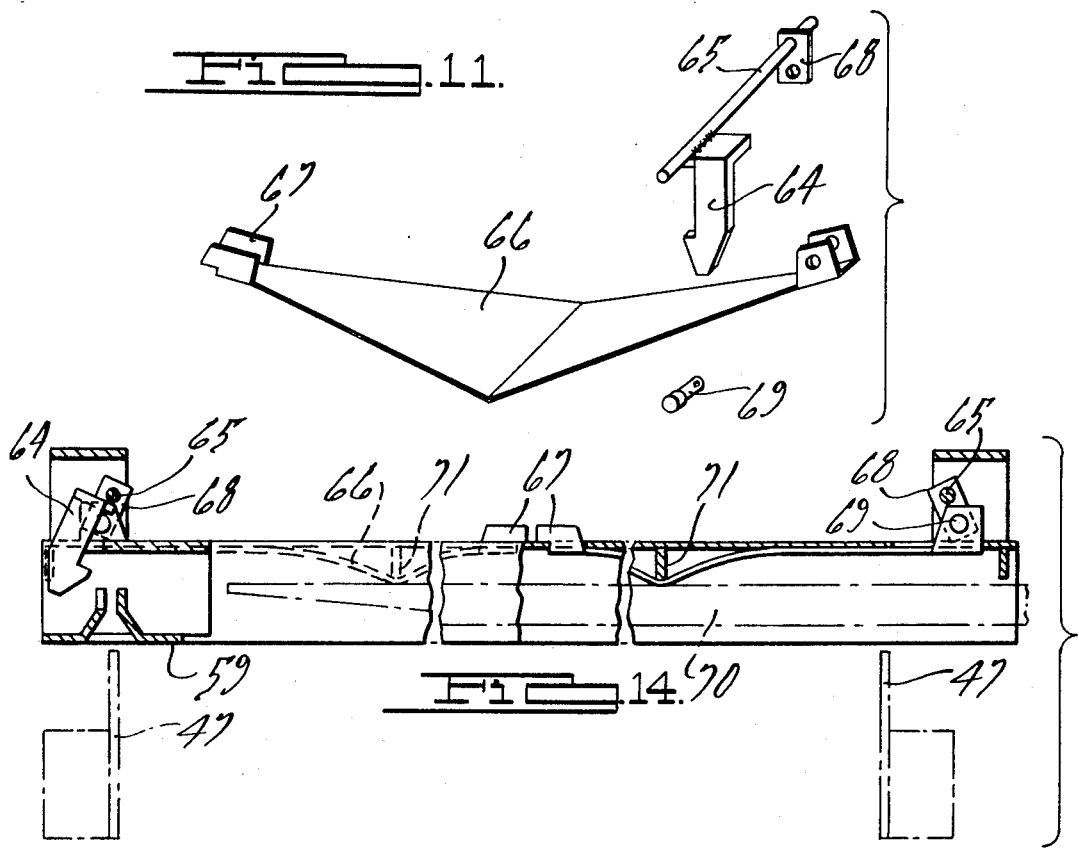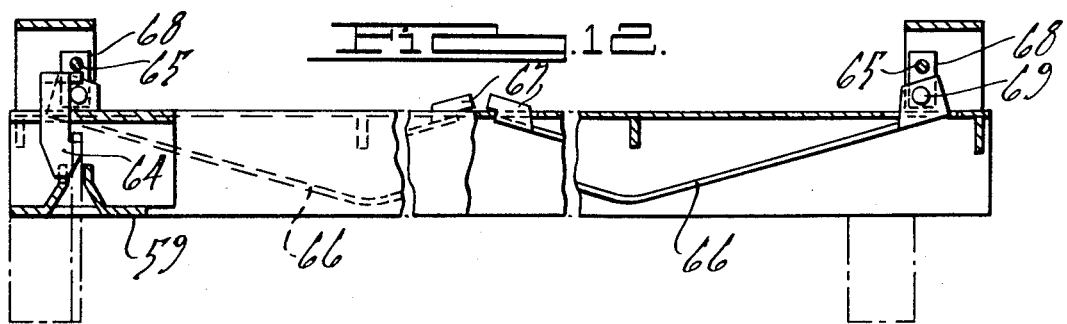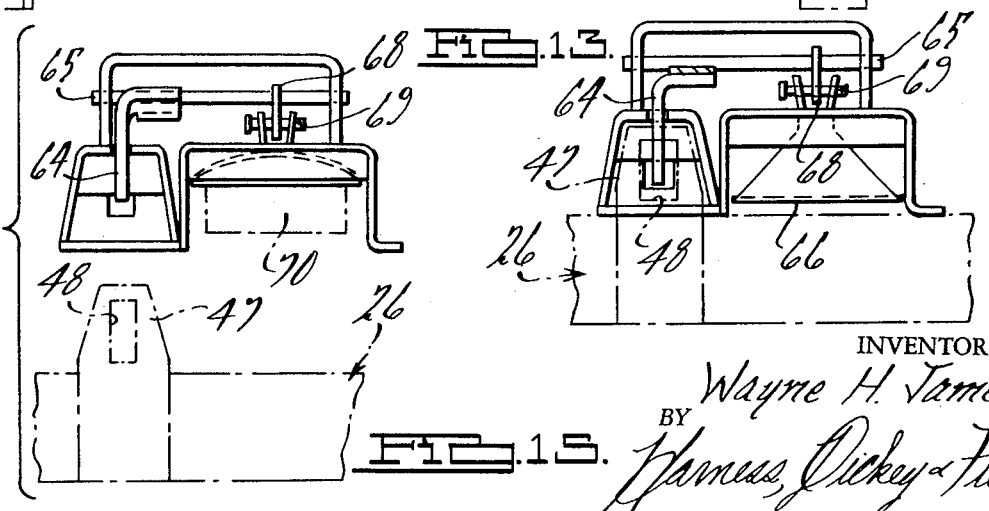

MEANS FOR TRANSPORTING PALLETIZED LOADS

BACKGROUND OF THE INVENTION

1. Field of the Invention

The invention relates to means for transporting palletized loads in containers such as seagoing containers, railroad cars or highway trailers.

2. Description of the Prior Art

Although collapsible industrial pallet racks are known, such as that shown for example in Baker U.S. Pat. No. 3,044,633, the applicant is unaware of any means for transporting palletized loads which will accomplish the purposes set forth herein.

SUMMARY OF THE INVENTION

According to the invention, a series of racks is provided for installation in the container, each rack comprising a pair of rectangular end frames and tiers of front and rear beams extending between these frames. The end frames, each of which comprises front and rear posts and upper and lower connecting members, are positioned against the side walls of the container, and the beams extend therebetween. Each beam comprises a pair of telescoping members adjustably secured at the desired length, and end tabs which project into slots in the frame posts. The cross-sectional shapes of the members are such that they will be frictionally connected when under load, preventing withdrawal of the tabs from the slots.

Pallets are provided for mounting on the beams, each pallet having latch sockets which receive upstanding lugs on the beams, and latches in said sockets which engage the lugs. The cargo, such as automotive engines, is secured to appropriate portions of the pallets. The latches are retractable in response to the presence of a fork lift on the underside of the pallet, through the engagement of leaf springs which normally urge the latches to their latching position.

The invention provides secure, reusable means for shipping palletized loads, which is adjustable to fit different container sizes. The shipping means will withstand shock and vibration and is easy to load and unload from the containers.

BRIEF DESCRIPTION OF THE DRAWINGS

FIG. 1 is a plan cross-sectional view of a container showing the racks and pallets of the invention therein;

FIG. 2 is a fragmentary side elevational view in cross-section of the container showing one of the racks;

FIG. 3 is an end cross-sectional view of the container with the racks therein;

FIG. 4 is a side elevational view of one of the beams;

FIG. 5 is a top plan view of the beam;

FIG. 6 is a fragmentary perspective view of an end portion of the beam and a portion of a frame post;

FIG. 7 is an enlarged cross-sectional view of the beam and an adjacent portion of the post;

FIG. 8 is a top plan view of a pallet;

FIG. 9 is an end elevational view of the pallet;

FIG. 10 is a side elevational view of the pallet;

FIG. 11 is an exploded view of the latch and spring portions of the pallet;

FIG. 12 is a side cross-sectional view in elevation of a pallet showing the latches in their latching position;

FIG. 13 is an end elevational view of the parts shown in FIG. 12;

FIG. 14 is a view similar to FIG. 12 but showing the latches withdrawn upon lifting by a fork lift; and FIG. 15 is an end elevational view of the parts shown in FIG. 14.

DESCRIPTION OF THE PREFERRED EMBODIMENT

The invention comprises a series of racks indicated generally at 11, 12, 13, 14 and 15 in FIG. 1, these racks being adapted to be mounted in a container generally indicated at 16. This container may be a seagoing container of the type which is transportable in cargo vessels, on highways or by rail, and has a floor 17, roof 18, side walls 19 and 21, an end wall 22, and doors 23 and 24.

Each rack 11 through 15 comprises a pair of end frames generally indicated at 25 and tiers of front and rear beams generally indicated at 26 and 27 respectively. Each frame 25 (FIG. 2) comprises a pair of front and rear posts 28 and 29, and top and bottom cross members 31 and 32. Posts 28 and 29 are of channel-shaped cross section (FIG. 6) and are provided with vertically spaced rectangular apertures 33. The height of frames 25 is such as to fit beneath roof 18 when resting on floor 17 of the container, but is sufficient to permit desired adjustment of beams 26 and 27 as described below.

The construction of beams 26 and 27 is seen in FIGS. 4, 5, 6 and 7. Each beam comprises a pair of telescoping members 34 and 35, member 35 fitting within member 34. The general cross-sectional shape of these beams is as shown in Kimpton U.S. Pat. No. 3,194,408, each member having upper and lower horizontal flanges, a central vertical web, and inclined upper and lower webs connecting the vertical web with the flanges. The construction is such that when a vertical load is placed on the beam, the inclined upper and lower webs of members 34 and 35 will be frictionally connected, thereby preventing telescoping movement of the beam. The beam members are further connected by bolts 36 and nuts 37 with handles 38, the bolts being mounted in any of a series of non-circular apertures 39 of member 34 and passing through slots 41 in member 35.

Members 34 and 35 are provided with end brackets 42 and 43 respectively, these brackets having tabs 44 which are adapted to be received by slots 33 of posts 28 and 29. Thus, the beams may be adjusted to their proper length so as to extend between the posts and form a unitary rack.

When assembling the racks in container 16, the frames 25 of rack 11 will first be placed in the container and beams 26 and 27 secured therebetween. The sequence of mounting beams 26 and 27 between the rack frames will depend upon the nature, shape and size of the palletized parts which are being loaded. As shown in FIGS. 1 to 3, two tiers of beams 26 and 27 are provided in each rack, the load for the lower tier being indicated at 45 and that for the upper tier being indicated at 46.

Beam member 34 is provided with a pair of spaced lugs 47 for engagement by latches (described below) on the pallet. These lugs have rectangular apertures 48 for receiving the latches. The construction of the beams may be such that lugs 47 will be on the centerline of posts 28 regardless of the fore-and-aft orientation of lugs 44 in the post apertures.

After the pallets have been mounted on rack 11, rack 12 will be assembled in a similar manner and loaded. Racks 13, 14 and 15 will be successively assembled and loaded. If necessary, dunnage indicated schematically at 48 in FIG. 1 may be placed at the forward end of the container.

The construction of each pallet is shown in FIGS. 8 through 15. The pallet is generally indicated at 49 and comprises outer beams 51 and 52, inner beams 53 and 54, and cross members 55, 56, 57 and 58 connecting the beams on the undersides thereof. Four downwardly open sockets 59, 61, 62 and 63 are provided at the outer ends of cross members 56 and 57, and are adapted to receive lugs 47. Latches 64 are pivotally mounted at 65 above these sockets and are normally urged to a latching position by V-shaped leaf springs 66 within inverted channel-shaped members 56 and 57. The inner end 67 of each spring 66 is supported by member 56 or 57 and the outer end is pivotally connected to a lever 68, mounted on shaft 65, by a clevis pin 69. Normally, springs 66 will hold latches 64 in their latching position as shown in FIGS. 12 and 13. However, when the forks 70 of a fork lift (not shown) are inserted in members 56 and 57 and raised, they will tend to flatten springs 66 as shown in FIGS. 14 and 15, thus pivoting latches 64 to their unlatching position so that the pallet may be lifted from the beams. Similarly, the pallets may be mounted on the beams by lowering the forks 70 and permitting latches 64 to swing into latching position within apertures 48 as forks 70 are withdrawn from springs 66. Reinforcing members 71 are provided for preventing undue flattening of springs 66 by the forks.

Beams 51 through 54 are shown as being provided with eyes 72 for securing parts such as automotive engines 73 (FIG. 1) thereon. However it should be understood that the principles of the invention encompass the shipping of other palletized cargo.

What is claimed is:

1. In a collapsible shipping rack construction for use in conjunction with a container having side walls and a floor, a pair of separate frames of rectangular flat shape placed against the opposite sides of the container, each frame having a pair of front and rear posts and upper and lower members connecting the posts, tiers of front and rear telescoping beams extending between the posts, the beam ends and posts having interfitting means for detachably supporting the beams on the posts, said interfitting means comprising vertically spaced apertures in said posts and lugs on said beam ends receivable by said apertures, whereby each tier of front and rear beams is selectively mountable at a variety of heights, means preventing telescoping of the beams after they have been mounted in position, whereby said frames are held in spaced relation, a pallet, and interfitting means on said rack beams and pallet for detachably securing the pallet to the beams, said last-mentioned interfitting means comprising spaced lugs on each beam, downwardly open sockets on the pallet receiving said lugs, latches movably mounted on said pallet and connectable to said lugs, and means on said pallet responsive only to the presence of a fork lift therebeneath and to the subsequent upward lifting movement of the fork lift to move said latches to an unlatching position.

2. The combination according to claim 1, said last-mentioned means comprising springs directly engageable by said fork lift, said springs normally urging said latches to their latching position.

3. Means for mounting a pallet on a support comprising upstanding lugs on said support, downwardly open sockets on said pallet receiving said lugs, latches mounted on said sockets and engageable with said lugs, and means on the underside of said pallet responsive only to the presence of a fork lift beneath said pallet and to the subsequent upward lifting movement of the fork lift to move said latches to unlatching position.

4. The combination according to claim 3, said last-mentioned means comprising springs directly engageable by said fork lift, said springs normally urging said latches to their latching position.

5. Means for mounting a pallet on a support comprising upstanding lugs on said support, downwardly open sockets on said pallet receiving said lugs, latches mounted on said sockets and engageable with said lugs, means on the underside of said pallet responsive to the presence of a fork lift to move said latches to unlatching position, said last-mentioned means comprising V-shaped leaf springs connected at one end to said pallet and at the other end to said latches and normally urging said latched to their latching position, said springs being actuatable by said fork lift.

6. The combination according to claim 5, said springs being disposed in inverted channel-shaped members of said pallet.

* * * * *